United States Patent

[11] 3,556,135

| [72] | Inventors | Takuji Koyama<br>Kobe-shi;<br>Hiroshi Nosaka, Akashi-shi Japan |
|---|---|---|
| [21] | Appl. No. | 839,813 |
| [22] | Filed | July 8, 1969 |
| [45] | Patented | Jan. 19, 1971 |
| [73] | Assignee | Mitsubishi Jukogyo Kabushiki Kaisha<br>Tokyo, Japan |
| [32] | Priority | July 10, 1968 |
| [33] | | Japan |
| [31] | | No. 43/47795 |

[54] AUTOMATIC FLOW CONTROL VALVE
4 Claims, 2 Drawing Figs.

[52] U.S. Cl. .................................................. 137/501,
                                                        251/205
[51] Int. Cl. ..................................................... G05d 7/00
[50] Field of Search ........................................... 137/494,
        484.6, 484.8, 497, 500, 501; 251/205

[56] References Cited
UNITED STATES PATENTS

| 316,626 | 4/1885 | Jackson.................... | 137/501 |
| 1,290,122 | 1/1919 | Donovan et al............... | 137/501X |
| 2,343,375 | 3/1944 | Herman........................ | 137/501X |
| 2,592,380 | 4/1952 | Beckett......................... | 137/501 |
| 2,646,070 | 7/1953 | Holland........................ | 137/494 |
| 2,718,265 | 9/1955 | Conrad......................... | 137/494X |
| 3,338,263 | 8/1967 | Altmeppen et al. ........... | 137/494X |
| 3,343,217 | 9/1967 | Daubenberger............... | 137/494X |

*Primary Examiner*—M. Cary Nelson
*Assistant Examiner*—Robert J. Miller
*Attorney*—Mc Glew and Toren

ABSTRACT: An automatic flow control valve is formed of a housing defining a valve chamber and a valve body axially displaceable within the valve chamber. The juxtaposed surfaces of the valve chamber and valve body form a flow passageway through the valve and are arranged to avoid any sudden changes in the cross-sectional flow area. The juxtaposed surfaces have a frustoconical shape converging in the direction of flow of a pressurized fluid through the valve. The valve body and the valve chamber cooperate to form a number of separate chambers which receive pressurized fluid for balancing the counteracting forces on the valve for regulating flow through it.

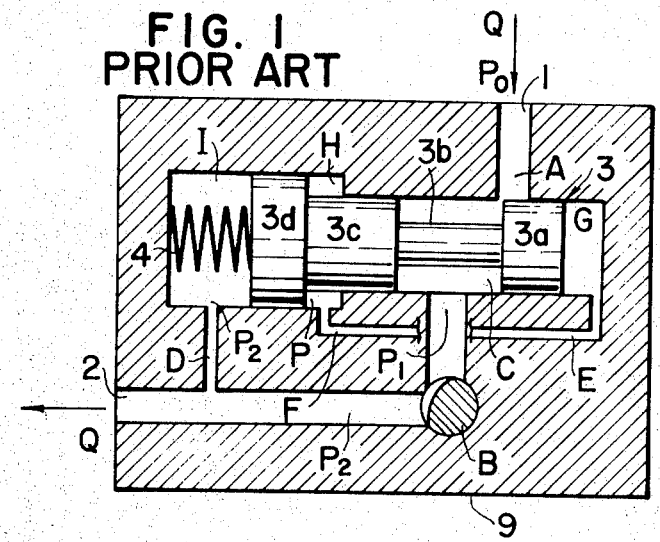
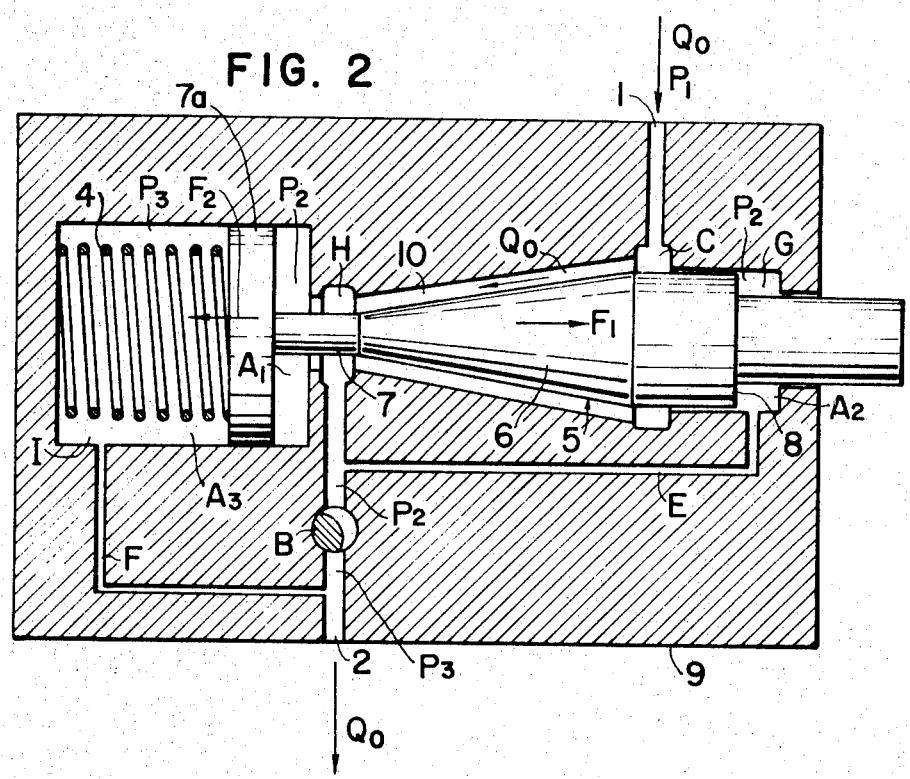

3,556,135

AUTOMATIC FLOW CONTROL VALVE

SUMMARY OF THE INVENTION

The present invention is directed to an automatic flow control valve, and more particularly, it is concerned with the arrangement of the flow passageway surfaces within the valve for avoiding any sudden changes in cross-sectional area in response to pressure changes within the fluid flowing through the valve for preventing cavitation and vortical flow.

Generally, the quantity of fluid flowing through a valve is increased or decreased in direct relationship with the increase or decrease of the square root of the pressure differences in the fluid passing through the valve, that is, the pressure differences in the fluid at the inlet to and the outlet from the valve. However, when the pressure differences within the valve vary upwardly or downwardly, an automatic flow control valve must be able to regulate the resistance within the valve for maintaining a selected flow rate from the valve.

In the past, automatic flow valves have been used having a configuration generally as indicated in FIG. 1 of the drawing. In these known valves, an adjustable throttle is located within the outlet from the valve for regulating the flow rate. The valve body positioned within the valve chamber has a number of oppositely directed surfaces which combine with the valve body to form separate pressure chambers within the valve. At the entranceway to the flow passage about the valve member an automatic throttle is provided which regulates the flow entering the valve. As the fluid flowing through the valve enters the outlet passageway, upstream from the adjustable throttle, a certain amount of the fluid is diverted into separate chambers which urge the valve in the closing direction in opposition to a spring member which acts against the valve body urging it in the opening direction. Moreover, the chamber containing the spring is connected to the outlet passageway from the valve and a point downstream from the adjustable throttle so that it receives a flow of fluid having a reduced pressure compared to the fluid supplied to the other chambers which direct the valve in the closing direction. Under normal operating conditions, the pressure of the fluid within the various chambers in the valve, in combination with the spring member urging the valve into the opened position, are in equilibrium and the flow rate through the valve is maintained at a selected rate.

When the pressure at the inlet to the valve is increased, the fluid flowing through the valve is similarly increased whereby the resistance at the adjustable throttle increases in relationship to the jet action at the automatic throttle. As the pressure increases within the valve the equilibrium conditions are broken and the valve moves in the closing direction against the action of the spring member. The closing action of the valve reduces the opening of the automatic throttle to the valve passageway. The valve is displaced until the pressure conditions become equalized again with the pressure differences on the opposite sides of the adjustable throttle restored to the original level and the flow conditions from the valve being maintained at the same rate in spite of the change in pressure at the inlet.

Similarly, when the pressure of the fluid at the inlet is reduced, the flow rate is simultaneously reduced and the pressure at the upstream side of the adjustable throttle is reduced as the jet action at the automatic throttle is lowered. With the decrease in pressure within the valve the combination of the spring and pressure acting in the opening direction tend to displace the valve into a new state of equilibrium with the automatic throttle being opened for increasing the flow rate through the flow passageway with the flow rate through the adjustable throttle to the outlet of the valve being maintained at the selected rate. In this way the pressure differences on the upstream and downstream sides of the variable throttle are maintained at a constant level regardless of any changes in the pressure differences in the fluid supplied to the valve which result from the jet action of the fluid flowing through the automatic throttle and the action of the spring which tends to displace the valve in the opening direction. The major resistance to flow through the valve takes place at the automatic throttle at which point the fluid enters the flow passageway through the valve body, when the flow rate through the automatic throttle is abnormally high there is tendency for cavitation to develop which results in abnormal pressure and noise conditions. Such conditions make the valve unfit for use where noiseless operation is an imperative characteristic.

Accordingly, the primary object of the present invention is to provide a valve construction which permits the regulation of flow at selected rates while minimizing, to as great an extent as possible, the amount of noise developed within the valve under varying pressure conditions.

Another object of the invention is to shape the valve and the valve chamber in such a manner that the cross sectional area of the flow passageway through the valve is not exposed to sudden changes as a result of changes in the pressure conditions affecting the valve.

Therefore, in accordance with the present invention, the valve member and valve chamber are shaped to avoid any sudden changes in the cross-sectional flow area through the valve in response to pressure changes in the fluid flowing through the valve and past the adjustable throttle at the valve outlet. Preferably, the valve chamber and the opposed surfaces of the valve have a frustoconical shape forming a annular passageway or throat section for conveying the pressurized fluid from the inlet to the outlet passageway of the valve. The frustoconical surfaces are arranged to converge in the direction of flow from the inlet to the outlet of the valve. Unlike conventional flow control valves where the throttling effect took place within a relatively small area, in the present invention the throttling effect is obtained by the axial displacement of the frustoconically shaped valve member in the axial direction relative to the similarly shaped surfaces of the valve chamber so that unfavorable disturbances within the fluid flowing through the valve are avoided with the result that the conditions which tend to cause noise are minimized by being distributed over a much greater surface than was the case in the prior art, and the distribution of the pressure of the fluid flowing through the valve to various surfaces within the valve tends to dampen tends to dampen the effect of pressure change on the valve body.

The various features of novelty which characterize the invention are pointed out with particularly in the claims annexed to and forming a part of this specification. For a better understanding of the invention, its operating advantages and specific objects attained by its use, reference should be had to the accompanying drawings and descriptive matter in where there is illustrated and described a preferred embodiment of the invention.

BRIEF DESCRIPTION OF THE DRAWINGS

In the drawing:

FIG. 1 is a longitudinal view through a valve, partly in section, illustrating a conventional automatic flow control valve; and FIG. 2 is a longitudinal view, partly in section, illustrating a preferred embodiment of the present invention.

DETAILED DESCRIPTION OF THE INVENTION

In FIGS. 1 and 2, similar parts of the valves are represented by the same reference characters.

As shown in FIG. 1, a conventional automatic flow control valve is comprised of a valve housing 9 forming an axially extending valve chamber C within which a spool valve 3 is arranged for axial displacement. Pressurized fluid is supplied to the valve through an inlet passageway 1 which, in combination with the cylindrical end part 3a of the spool valve, forms an automatic throttle at the opening from the inlet passageway 1 into the valve chamber C. An outlet passageway 2 extends from the valve chamber C outwardly through the valve housing with the connection to the valve chamber C being spaced axially in the closing direction of the valve from the automatic throttle A.

Within the outlet passageway 2, a variable or adjustable throttle B is provided which divides the passageway into an upstream section wherein the fluid has a pressure $P_1$ and a downstream section in which the fluid has a pressure $P_2$ lower than the pressure $P_1$ due to the pressure loss which occurs through the adjustable throttle B.

In addition to the cylindrical end part 3a, the valve is formed of a cylindrically shaped intermediate part 3b *having a diameter less than that of the end part 3a* and extending through the chamber C spaced from the walls of the chamber to provide a flow passage from the inlet passageway 1 to the outlet passageway 2. At its downstream end the intermediate connector part 3b is connected to a cylindrically shaped part 3c in closely fitting engagement with the walls of the chamber C for a portion of its length and extending axially into an enlarged piston cylinder section of the valve chamber. At the end of the cylindrically shaped part 3c a piston 3d is provided in closely fitting sliding engagement within the piston cylinder and dividing it into a pair of chamber H, I. A spring 4 is positioned within the chamber I and acts against the piston 3b for biasing the valve 3 in the opening direction that is, for displacing the end part 3a in the rightward direction for opening the automatic throttle A of the valve.

At the end of the valve chamber containing the end part 3a of the valve, the opposite surfaces of the valve chamber and the end part combine to form a chamber G.

Upstream from the adjustable throttle B within the outer passageway 2 a first auxiliary passageway E extends through the housing into communication with the chamber G, and a second auxiliary passageway F extends through the housing into communication with the chamber H. Downstream from the adjustable throttle B a third auxiliary passageway D extends into communication with the chamber I.

In operation, the flow rate of the pressurized fluid through the valve is regulated by the adjustable throttle B. Under normal operating conditions where the pressure conditions within the valve remain unchanged, a state of equilibrium exists with the valve 3 located in a stationary position. The fluid flows through the inlet passageway 1, passing through the automatic throttle A determined by the position of end part 3a within the valve chamber, and then passes through chamber C into the outlet passageway 2 where in flows through the adjustable throttle B. Due to the pressure loss through the adjustable throttle a pressure P1 exists in the upstream section of the outlet passageway which is higher than the pressure $P_2$ in the portion of the outlet passageway downstream from the adjustable throttle. While the valve is in a state of equilibrium, the forces tending to open the valve, that is, to move it in the rightward direction are balanced by the forces tending to close the valve acting the leftward direction on the surfaces of the valve. The forces tending to open the valve are provided by the spring 4 and the pressure P2 acting against the piston 3d within the chamber I. Conversely, the forces tending to close the valve are exerted by the pressure Pl acting in the chamber G against the end surface of the end part 3a of the valve and within chamber H acting against a surface of the piston 3d. Moreover, the jet action of the pressurized fluid passing through the variable throttle combines with the pressurized fluid within the chambers G and H to provide a balance for the valve against the forces provided by the spring 4 and the pressure P2 of the fluid within the chamber I. With the thrust of forces on the valve being balanced it is maintained in a state of equilibrium.

When the pressure $P_0$ at the inlet 1 of the valve is increased, the fluid passing through the valve increases in flow Q and the resistance at the adjustable throttle B is increased as the jet action at the automatic throttle A becomes higher. As pressure $P_1$ increases the state of equilibrium of the valve 3 is broken and the valve moves in the closing direction, that is, to the left, and as it the end part 3a of the valve moves toward the left, it closes or reduces the opening of the automatic throttle A. This closing action continues until the flow rate of the fluid passing through the variable throttle again reaches the pressure differential on the upstream and downstream sides of the throttle whereby the pressure within the chamber C is reduced and the spool valve 3 again resumes its state of equilibrium.

When the pressure P0 at the inlet 1 drops the flow rate Q is reduced instantaneously and the fluid pressure $P_1$ in the chamber C is reduced because of the lower jet action at the automatic throttle A. Accordingly, the force or pressure supplied to the chambers G, H is reduced and the thrust in the rightward direction for opening the valve exerted by the spring and the pressure $P_2$ within the chamber I causes the spool valve to move to the right. The rightward movement of the valve 3 stops as a new state of equilibrium is reached when the resistance at the automatic throttle A is reduced and increases the flow rate so that the pressure $P_1$ in the chamber C is increased and the flow rate of the fluid passing through the variable throttle is maintained at the selected rate.

Due to the balancing effect obtainable within the valve, the pressure difference $P_1 - P_2$ on the upstream and downstream sides of the variable throttle B is maintained at a constant level regardless of any fluctuations in the conditions of the fluid being supplied to the valve, or of the pressure differences within the valve due to the jet action of the automatic throttle and the opening action of the spring 4. Since the major resistance within the valve exists at the location of the automatic throttle A, a relatively small resistance is expected from the variable throttle B, the flow rate at the automatic throttle is abnormally high and tends to cause cavitation which results in abnormal pressure and noise making the valve unfit for noiseless operation where such condition of operation is imperative.

In FIG. 2, a valve in accordance with the present invention is illustrated, with the valve and the valve chamber being shaped to overcome the problems previously experienced in the prior art. The valve is formed of a valve housing shaped to form an axially extending valve chamber C which is divided into a number of separate chambers by means of a valve member 5 which is axially displacable through the chamber. Intermediate its ends, the valve member 5 is formed with an axially extending frustoconically shaped part 6 positioned within a similarly shaped section 10 of the valve housing forming a throat section or annular passageway for the flow of fluid through the valve as the valve member 5 is axially displaced within the housing. An inlet passageway 1 extends through the housing 9 to the base or larger diameter end of the valve chamber while an outlet passageway 2 is located at the apex or smaller diameter end of the frustoconical surface of the chamber for discharging fluid after its passage over the frustoconical part 6 of the valve member. At the opposite ends of the frustoconical part 6 the valve member is formed of a cylindrically shaped end part 7 and another cylindrically shaped end part 8 each of a proper dimension for supporting the valve member within the chamber in the housing. At one end of the chamber the end part 8 combines with the inner surfaces of the chamber to form a chamber G while the opposite end part 7 combines with the surfaces of the chamber to form another chamber H in communication with the annular passageway at the apex end of the frustoconical section of the chamber. The end of the end part 7 within chamber H has a piston 7a in sliding engagement with the walls of the chamber and combining therewith to form another chamber I at the left end of the valve. Within the chamber I a spring 4 is provided which acts between the face of the piston 7a and the opposite surface of the housing within the chamber and urges the valve 5 in the rightward direction, that is, in the opening direction of the valve.

In the outlet passageway 2 an adjustable throttle B divides it into an upstream section wherein a pressure $P_2$ of the fluid exists and a downstream section wherein a pressure $P_3$ exists which is lower then the pressure $P_2$ due to the reduction in pressure which occurs as the fluid flows through the throttle B.

From the upstream section of the outlet passageway 2, a first auxiliary passageway E extends to the chamber G at one end of the valve. From the downstream section of the outlet passageway 2, a second auxiliary passageway F extends to the chamber I at the opposite end of the valve.

In describing the operation of the valve illustrated in FIG. 2, it is based on the assumption that $$\Delta P_0 = P_2 - P_3.$$

$P_2$ represents the pressure at the upstream side of the adjustable throttle B;
$P_3$ represents the pressure at the downstream side of the adjustable throttle B; and
$P_3$ is assumed to be a constant.

During operation, flow $Q_0$ is supplied to the inlet passageway 1 of the valve, it enters the chamber C and passes through the throat section or annular passageway formed by the frustoconical section surfaces within the valve and then enters the chamber H at the small diameter end of the frustoconical section or flows outwardly from the valve through the outlet passageway 2 passing through the adjustable throttle B. The pressure $P_2$ at the upstream side of the adjustable throttle is supplied through the first auxiliary passageway B into the chamber G. The pressure $P_3$ is supplied into the chamber I by means of the second auxiliary passageway F.

If the pressure $P_1$ at the entrance to the valve is lowered the pressure $P_2$ within the chamber H at the downstream end of the throat section is reduced due to the fluid resistance within the throat section. Additionally, the fluid flowing into the outlet passageway 2 imparts the pressure $P_2$ into the chamber G at the upstream end of the valve, and, after the pressurized fluid flows through the adjustable throttle B, a portion of it is bypassed through the second auxiliary passageway F into the chamber I at a reduced pressure $P_3$.

With the change in pressure $P_1$ there are two groups of balancing forces being exerted on the valve member 5 as follows:

1. The forces acting in the opening or the rightward direction consist of:
   a. axial force $F_1$ produced by the pressure of the fluid acting on the frustoconical part 6 of the valve;
   b. the product of the pressure $P_3$ multiplied by the area $A_3$ of the chamber I; and
   c. the axial thrust of the spring 4 within the chamber I against the piston 7a.
2. The forces acting in the leftward direction, that is the closing direction of the valve, consist of:
   a. The product of the pressure $P_2$ acting within the chamber H, G and multiplied by the areas $A_1$, $A_2$, respectively; and
   b. the jet force $F_2$ of the fluid entering into the chamber H from the throat section about the valve.

These balancing forces can be represented by the following formula:

$$P_2(A_1 + A_2) + F_2(Q \cdot X \cdot \theta) = P_3 A_3 + F_1(Q \cdot X \cdot \theta) + KX \quad (1)$$

where $K =$ the spring constant of the spring 4.
$X =$ the displacement of the valve from its equilibrium position.
$\theta =$ the angle of taper or cone angle of the surfaces of the frustoconical part of the valve 5.
$F_1(Q \times \theta)$ and $F_2(Q \times \theta)$ show the axial forces $F_1$ and $F_2$ are functions of the quantity of flow Q, the valve displacement X and the angle of the surfaces of the frustoconical part of the valve respectively. Assuming $A_1 + A_2 = A_0$ and the areal ratio $\lambda = \dfrac{A_0}{A_3}$ and selecting area $A_0$ and $A_3$ to fulfill the following relationship:

$$P_2(A_1 + A_2) = P_2 A_0 = P_3 A_3 \quad (2)$$

$$P_2 \lambda A_3 = P_3 A_3$$

$$\therefore \lambda P_2 = P_3 \text{ Assuming } P_2 = P_3 + \Delta P_0.$$

$$\frac{1}{\lambda} = \frac{P_3 + \Delta P_0}{P_3} = 1 + \frac{\Delta P_0}{P_3} \quad (3)$$

The adjustable throttle must be determined so that the flow rate in accordance with Formula (3) can be fulfilled. Therefore the Formula (1) can be represented as follows:

$$F_2(Q \cdot X \cdot \theta) = F_1(Q \cdot X \cdot \theta) + KX \quad (4)$$

This formula shows that the flow control valve in accordance with the present invention provides a balanced operation at the desired flow rate Q regardless of any fluctuation in the pressure differences within the valve ($\Delta P_1 = P_1 - P_2$) due to automatic operation of the valve member. Unlike the conventional flow control valves previously used, which has been known to cause undesirable noises because of the resistance within the valve caused by sudden cross-sectional flow area changes at the automatic throttle, in the present invention the valve does not give rise to such undesirable noises because the factors which tend to cause noise are successfully dampened by the manner in which the various pressure condition within the housing act against the valve surfaces to absorb any surplus of pressure which exists.

We claim:
1. A flow control valve capable of supplying fluid at a given flow rate regardless of pressure fluctuations within the valve, comprising a valve housing forming an axially extending valve chamber, said valve chamber comprising a cylindrically shaped axially extending section at each of the opposite ends thereof and a frustoconically-shaped axially extending section positioned therebetween, a spool valve positioned within said valve chamber and being axially displaceable therein, said spool valve comprising an axially extending frustoconical part intermediate the ends thereof and located within the frustoconically-shaped section of said valve chamber, the surfaces of said frustoconical section of said valve chamber and of said frustoconically part being spaced apart forming an annular flow passageway therebetween whereby no sudden changes in cross sectional area take place as said valve is axially displaced, an inlet passageway in said valve housing for supplying fluid to said annular passageway at the larger diameter end of said frustoconical section, an outlet passageway in said valve housing for receiving fluid from the smaller diameter end of said frustoconical section after its passage through said annular passageway for discharging the fluid from said valve, an adjustable throttle in said outlet passageway for regulating flow therethrough, a first cylindrical shaped end part of said valve extending from the larger diameter end of said frustoconical part into one of the cylindrically shaped sections at the ends of said valve chamber and being slidably positionable therein, said first cylindrically shaped end part having a transverse surface thereon cooperating with the surfaces of said cylindrically shaped section forming a first end chamber, a second cylindrically shaped end part of said valve extending from the smaller diameter end of said frustoconical part of said valve into the other one of the cylindrically shaped sections at the end of said valve chamber, a piston fixed to the end of said second end part within the other end section and dividing said end section into a second end chamber in communication with said annular passageway and a third end chamber on the opposite side of said piston, biasing means within said third end chamber for urging said valve in the opening direction, a first auxiliary passageway communicating at one end with said outlet passageway upstream from said throttle valve and at its other end with said first end chamber, and a second auxiliary passageway communicating at one end with said outlet passageway downstream from said throttle valve and at its other end with said third end chamber whereby automatic regulation of the flow through the valve is obtained by the counterbalancing effect of the pressurized fluid acting on the various surfaces of the valve within the housing.

2. A flow control valve, as set forth in claim 1, wherein said biasing means comprising a spring member positioning within said third end chamber extending between said housing and the adjacent surface of said piston.

3. A flow control valve, as set forth in claim 1, wherein said cylindrically shaped section at the smaller diameter end of said frustoconically-shaped section of said valve chamber having a diameter considerably larger than the diameter of the adjacent surface of said frustoconically-shaped section, and a cylindrical extension of said valve extending from said smaller diameter end of said frustoconical part axially into said cylindrical end section and being fixed therein to said piston.

4. A flow control valve, as set forth in claim 1, wherein a first cylindrically shaped part extending axially from the larger diameter end of said frustoconically-shaped part and extending into the adjacent said cylindrically shaped end section of said valve chamber, and a second cylindrically shaped part having a smaller diameter than and being fixed to the end of said first cylindrically shaped part and extending axially therefrom.